United States Patent [19]

Kuwabara et al.

[11] Patent Number: 5,192,352

[45] Date of Patent: Mar. 9, 1993

[54] MOLDING METHOD USING GLASS BLANK

[75] Inventors: Tetsuo Kuwabara, Urawa; Shuji Murakami, Sagamihara, both of Japan

[73] Assignee: Canon Kabushiki Kaisha, Tokyo, Japan

[21] Appl. No.: 731,319

[22] Filed: Jul. 17, 1991

[30] Foreign Application Priority Data

Jul. 24, 1990 [JP] Japan .................. 2-194031

[51] Int. Cl.$^5$ .................. C03C 25/02; C03B 11/08
[52] U.S. Cl. .................. 65/60.53; 65/102; 65/111; 65/122; 65/37; 425/808; 428/428; 428/432
[58] Field of Search .......... 65/60.1, 60.5, 60.53, 65/24, 25.1, 37, 72, 102, 111, 122; 425/808; 428/432, 428

[56] References Cited

U.S. PATENT DOCUMENTS

| | | | |
|---|---|---|---|
| 3,899,314 | 8/1975 | Siegmund | 65/60.5 X |
| 3,907,534 | 9/1975 | Jonsson et al. | 65/208 X |
| 3,934,961 | 1/1976 | Hoh et al. | 65/60.53 X |
| 4,139,677 | 2/1979 | Blair et al. | 65/37 X |
| 4,629,487 | 12/1986 | Monji et al. | 65/37 X |
| 4,756,737 | 7/1988 | Yoshimura et al. | 65/102 X |
| 4,842,630 | 6/1989 | Braithwaite et al. | 65/111 X |

FOREIGN PATENT DOCUMENTS 62-202824 9/1987 Japan .
62-297225 12/1987 Japan .

Primary Examiner—Robert L. Lindsay
Attorney, Agent, or Firm—Fitzpatrick, Cella, Harper & Scinto

[57] ABSTRACT

The present invention relates to a glass blank for producing optical element used for the press molding thereof, having a core glass and a surface layer covering at least the optically functional surface of the core glass. The surface layer consists of an evaporation glass. This invention also relates to the technique to mold a glass lens using the glass blank.

4 Claims, 2 Drawing Sheets

F I G. 3
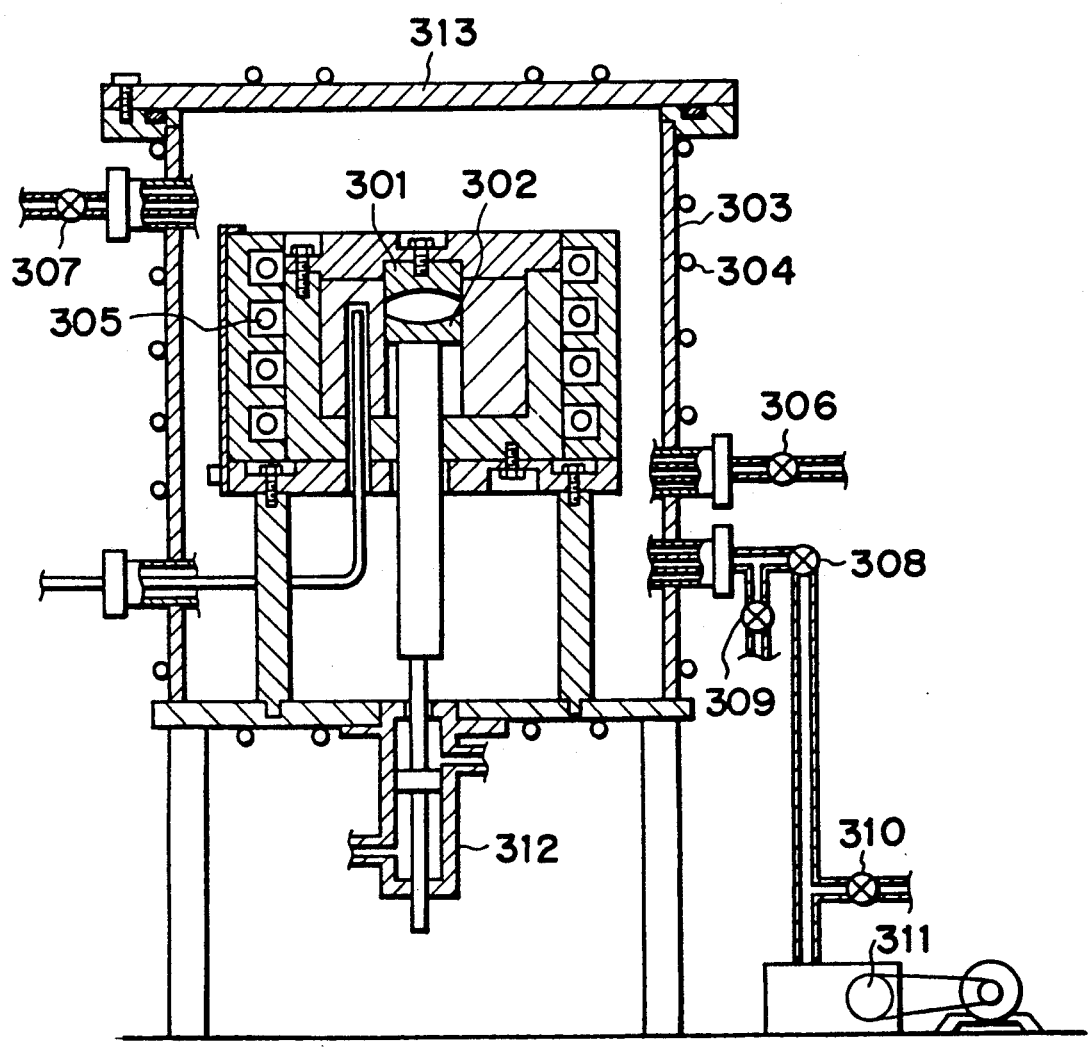

MOLDING METHOD USING GLASS BLANK

BACKGROUND OF THE INVENTION

1. Field of the Invention

The present invention relates to a glass blank used for the press molding of an optical element such as lens, and a method for producing the optical element.

2. Related Background Art

Traditionally, means given below have been proposed in order to prevent the fusion between the glass blank and molding mold or the haze occurring in an optical lens after its press molding, when a glass optical element is produced by the press molding.

In Japanese Patent Publication No. 2-1778, a press molding method is disclosed, in which the surface of the inner glass which is the core of a glass blank is covered with a glass having a higher transition temperature than that of the inner glass. Also, in Japanese Patent Publication No. 2-1779, a press molding method is disclosed for a glass blank covered with a silicon dioxide film, in which a glass having a lower transition temperature than that of the silicon dioxide film is used as its glass blank In these two methods proposed, the fusion between the mold and glass blank on molding is prevented by maintaining the surface covering layer in a non-softening state when the press molding is performed.

Nevertheless, in the conventional arts mentioned above, there still exist the problems set forth below.

With the molding methods for a glass blank having an optical glass material as its surface layer, which are specifically disclosed in the above-mentioned two paten publications, the prevention of the fusion between the mold and the glass blank is reliably improved. However, in a case where the optical glass material is processed into a thin film by a vacuum evaporation using an electron gun evaporation source, the glass blank which is the evaporation material is extremely foamed at the time of evaporation, leading to the generation of defects in the film or making it difficult to homogenize the film composition. Such a drawback also occurs in the thin film formation by sputtering with the glass material as its target.

In a case where the silicon dioxide film is used as the surface layer, there is also a drawback in that the generation of a surface crack is conspicuous at the time of molding.

SUMMARY OF THE INVENTION

Therefore, an object of the present invention is to provide a glass blank for the press molding of an optical element and a method for producing the same in which the prior arts are improved upon, to eliminate the crack in the surface layer of the glass blank and the defect in the layer, the optical element being covered with a surface layer material which does not cause to injure a releasability between mold and molded product.

Yet another object of the present invention is to provide a molding method for producing a glass lens using said glass blank, particularly for producing an aspherical lens having an aspheric shape on the optically functional surface thereof.

According to the present invention, there is provided a glass blank for producing an optical element, and used for the press molding of the optical element having a core glass and a surface layer to cover at least an optically functional surface of the core glass, wherein the surface layer consists of an evaporation glass. Further, there is provided a method for producing the glass blank used for molding the optical element in which the surface layer, consisting of the evaporation glass, is formed by the vacuum evaporation using an electron gun.

The present invention will be described in further in detail.

In the present invention, an evaporation glass (a glass for evaporation) is used as the material of the surface layer covering the surface of the core glass.

In the present invention, the evaporation glass means a glass material by which a fine and homogeneous film is formed, the glass material also having a characteristic of an evaporation stability. The composition of the evaporation glass is preferably $SiO_2$:70 or more and 90 or less, $Na_2O$:3 or less, $Al_2O_3$:3 or less, and $B_2O_3$: for the rest in weight %. As an example, there is a product named 8329 by Shot Inc.; its composition: $SiO_2$:84, $Na_2O$:3, $B_2O_3$:10, and $Al_2O_3$:3 in weight %.

Now, in the conventional glass blank comprising the core glass and the surface layer covering the surface of the core glass, the thermal expansion coefficients of the core glass and surface layer are defined as close as possible in consideration of thermal stress at the time of press molding in the post processing. Therefore, for example, if an SF8 (linear expansion coefficient, $77 \times 10^{-7}/°C.$) is used as a core glass to the above-mentioned evaporation glass 8329 (linear expansion coefficient, $27.5 \times 10^{-7}/°C.$), a crack generation is anticipated in the film after molding because the linear expansion coefficients are different by the order of $10^{-6}/°C$.

However, we have discovered that it is possible to obtain a molded product with a smooth surface layer while preventing the crack generation when only the film thickness and press molding condition are appropriately set, even in a case of the combination of glass materials each having a considerably different linear expansion coefficient, as described above.

For the present invention, it is possible to use a glass material as the core glass if its glass transition temperature is lower than that of the evaporation glass covered over the surface thereof by several 10 degrees or more.

The core glass is prepared in a desired shape before being covered by the evaporation glass.

As a method for forming the film of the evaporation glass, vacuum evaporation, sputtering, CVD or the like can be employed.

The film thickness of the surface layer should desirably be approximately 50 to 500 Å. If the thickness is less than 50 Å, the advantage of preventing the fusion becomes small. If it exceeds 500 Å, a crack tends to occur at the time of press molding in the post processing.

As a material for the mold to be used for the press molding of the glass blank, nitride, carbide, nitrogen carbide, or an alloy having these as main component can be used.

As the atmosphere at the time of press molding, nitrogen gas, air, or reducing atmosphere is applicable.

As the temperature for the press molding, a temperature should be selected so as not to cause the surface layer to be softened. Hence, the reaction of the surface layer to the mold is less to prevent the surface from degrading of the molded product as well as to reduce the adhesion between the surface layer and the mold to prevent the fusion.

An antireflection film, if required, is formed on the molded product by the press molding. In this case, the surface layer which has already been formed also contributes as an element constituting the antireflection film. Therefore, in order to obtain a desired antireflection film, the film structure is preferably designed in consideration of the thickness of the surface layer.

BRIEF DESCRIPTION OF THE DRAWINGS

FIG. 3 is a cross-sectional view showing an example of an apparatus for performing press molding.

DESCRIPTION OF THE PREFERRED EMBODIMENT

Hereinafter, an embodiment of the present invention will be described in reference to the accompanying drawings.

Embodiment

Figure 1:
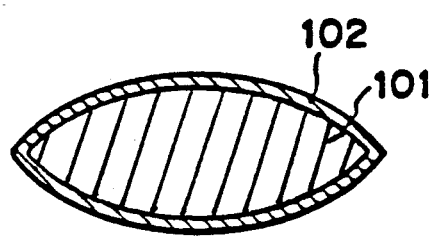
FIG. 1 is a cross-sectional view showing an embodiment of the glass blank according to the present invention.

FIG. 1 is a cross-sectional view showing an embodiment of the glass blank according to the present invention.

In FIG. 1, a reference numeral 101 designates the core glass of the glass blank, which is made of the dense flint optical glass SF8 (manufactured by Ohara). The composition of the SF8 is $SiO_2$:36.7, PbO:57.5, $K_2O$:4.2, $Na_2O$:0.8, and $B_2O_3$:0.8 in weight %. The glass transition temperature of this glass is 433° C., refractive index is 1.69, and linear expansion coefficient is $77 \times 10^{-7}/°C$.

A reference numeral 102 designates the surface layer made of an evaporation glass (Product name: 8329, manufactured by Shot Inc.) The composition of this product 8329 is $SiO_2$:84, $Na_2O$:3, $B_2O_3$:10, and $Al_2O_3$:3 in weight %. The transition temperature of this glass is 562° C., refractive index is 1.4689, and linear expansion coefficient is $27.5 \times 10^{-7}/°C$.

A method for producing the glass blank comprising the core glass and the surface layer according to the present invention will be described.

The SF8 finished by polishing to have a substantially similar con&our to a double-convex lens with a 26 mm diameter defined as a final product shape, is employed as the core glass 101. After the core glass 101 is cleaned in the usual glass cleaning process using a ultrasonic cleaning apparatus, the surface layer 102 is formed on the surface of the core glass 101 by the evaporation apparatus shown in FIG. 2.

Figure 2:
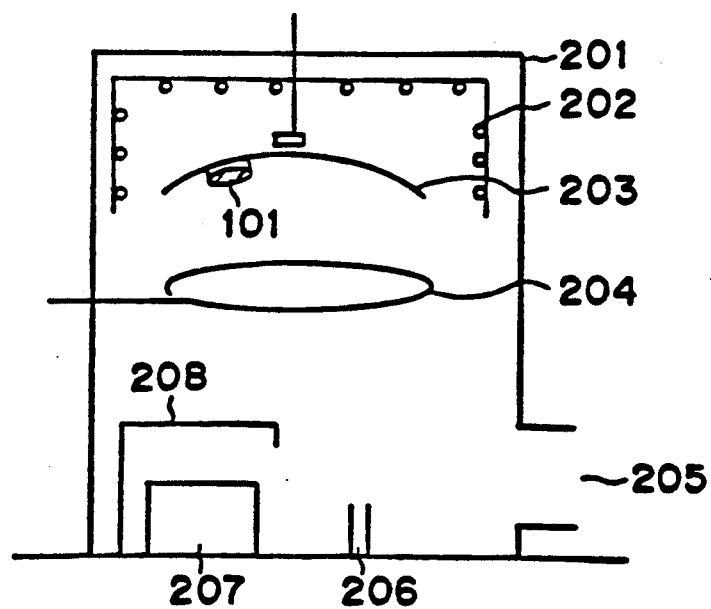
FIG. 2 is a schematic view illustrating the structure of the evaporation apparatus used for an embodiment of the glass blank producing method according to the present invention.

In FIG. 2, the core glass 101 is set in a film formation dome 203 and then mounted in a vacuum chamber 201. While the vacuum chamber 201 is evacuated through a evacuation outlet 205, the core glass 101 is heated up to 300° C. by a heater 202. After the degree of vacuum in the vacuum chamber 201 has reached $1 \times 10^{-5}$ Torr or less, Ar gas is introduced through a gas introducing port 206 until it reaches $5 \times 10^{-4}$ Torr. Then, an electric power of 300 W is applied to a high-frequency application antenna 204 to perform high-frequency discharging, thereby cleaning the core glass 101 for five minutes by plasma. Subsequently, the introduction of Ar gas is stopped, and the degree of vacuum is returned to $1 \times 10^{-5}$ Torr or more, then an evaporation glass (Product name: 8329) 207, which is an evaporation source is evaporated by an electron gun 208 to form the surface layer having 300 Å thickness on the core glass 101.

On observing the surface layer thus formed by means of an optical microscope with 400 magnification, there is no crack and it is found to be a smooth film.

Subsequently, the glass blank comprising the core glass and surface layer obtained by the above-mentioned method is molded by an apparatus for press molding shown in FIG. 3.

After the glass blank is mounted in the cavity of molding molds 301 and 302, the molding molds 301 and 302 are installed in the vacuum vessel 303. The molding molds 301 and 302 are made of binderless cemented carbide.

According to the results of our investigation, it is desirable to use a ceramic material such as SiC, $Si_3N_4$, and TiN as the material of the molds used for heating and press molding of the glass blank covered by the evaporation glass according to the present invention. Particularly, covering the surface of the molds with SiC, $Si_3N_4$ and TiN makes it possible to prevent the fusion of the glass.

Next, a cover 313 of the vacuum vessel 303 is closed, water is allowed to flow in a water cooling pipe 304, and then the heater 305 is energized. At this juncture, the nitrogen gas valves 306 and 307 are closed, and the exhaust valves 308, 309, and 310 are also closed. The oil-rotary pump 311 is always in motion. The valve 308 is opened to start exhausting. When the degree of vacuum reaches $10^{-2}$ Torr or less, the valve 308 is closed. Then, the valve 306 is opened to introduce the nitrogen gas from a gas cylinder to the inside of the vacuum vessel 303. When the temperature reaches 530° C., the air cylinder 312 is actuated to exert pressure on the glass blank for five minutes at 100 kg/cm². Subsequent to the removal of the pressure, cooling is performed at cooling rate of 5° C./min. until the temperature of the glass blank is lowered less than the transition temperature 425° C. of the core glass. After that, the cooling is performed at a cooling rate of more than 20° C./min, and when the temperature is decreased to 200° C. or less, the valve 306 is closed and the valve 309 is opened to introduce air into the vacuum vessel 303. Then, the cover 313 is opened to take out the molded product. In this way, a lens has been molded.

After that, nine glass blanks of the same kind have been produced in the same manner, i.e., a total of ten pieces have been molded.

As a result of the observation by an optical microscope (400-magnification), no fusion to the molds, occurred on the all of the molded product, and neither crack nor haze were found on the molded product.

Comparative Example

The SF8 (manufactured by Ohara) as used in said embodiment is used as the core glass.

A BaLF3 is used as a surface layer to cover the surface of the glass blank. The composition of the BaLF3 is $SiO_2$:44.8, BaO:21.7, $Na_2O$:5.26, $K_2O$:11.1, PbO:4.29, $B_2O_3$:2.77, ZnO:8.69, and others in weight %. The transition temperature of this glass is 490° C., refractive index is 1.57135, and linear expansion coefficient is $120 \times 10^{-7}/°C$.

The BaLF3 is formed as the surface layer on the polished core glass by the same manner as said embodiment.

As a result of the observation of this glass blank with the naked eye immediately after the evaporation, the generation of burning is observed on the surface layer.

Subsequently, the glass blank is molded by the same manner as said embodiment. The molding temperature is also set at 530° C. as in the case of said embodiment.

Thereafter, nine pieces of glass blank of the same kind were molded, i.e., a total of ten pieces were molded likewise.

As a results of observations of the molded products thus produced with the naked eye, these remained the burning generated in the glass blank as it is on the all of the molded products.

As set forth above, since the glass blank for press molding is used in which the evaporation glass is evaporated on the core glass, there is no fusion between the mold and the molded product, and there seldom occurs the crack even if there is a difference between the thermal expansion coefficients of the core glass and the evaporation glass.

We claim:

1. A molding method for molding a glass lens comprising the steps of:

preparing a core glass having a predetermined shape;

covering an evaporation glass upon aid core glass, said evaporation glass containing, in weight %, $SiO_2$:70 to 90, $Na_2O$: no more than 3, $Al_2O_2$: no more than 3, $B_2O_3$: the remaining %, wherein a thickness of a surface cover layer of said evaporation glass is in the range of 50 A to 500 A; and molding said core glass covered by said evaporation glass, wherein said core glass is heated up to a molding temperature and the heated core glass is pressed, thereby being molded to a lens shape.

2. A glass lens molded by the molding method according to claim 1, said glass lens being an aspherical lens having an aspheric surface on said optically functional surface.

3. A molding method according to claim 1, wherein the glass blank covered with said evaporation glass is molded by molds made of ceramic material such as SiC, $Si_3N_4$, TiN or of an cemented carbide in said molding step.

4. A molding method according to claim 3, wherein said SiC, $Si_3N_4$, or TiN is covered over surfaces of said molds.

* * * * *

UNITED STATES PATENT AND TRADEMARK OFFICE
CERTIFICATE OF CORRECTION

PATENT NO. : 5,192,352          Page 1 of 2
DATED      : March 9, 1993
INVENTOR(S): TETSUO KUWABARA, ET AL.

It is certified that error appears in the above-identified patent and that said Letters Patent is hereby corrected as shown below:

Column 1:
    Line 7, "lens" should read --a lens--.
    Line 32, "paten" should read --patent--.

Column 2:
    Line 4, "the" should be deleted.
    Line 6, "further in" should read --further--.
    Line 35, "the crack" should read --crack--.

Column 3:
    Line 48, "con&our" should read --contour--.
    Line 51, "a" should read --an--.
    Line 57, "a" should read --an--.

Column 4:
    Line 1, "source" should read --source,--.
    Line 52, "molds," should read --molds--.

UNITED STATES PATENT AND TRADEMARK OFFICE
CERTIFICATE OF CORRECTION

PATENT NO. : 5,192,352
DATED : March 9, 1993
INVENTOR(S) : TETSUO KUWABARA, ET AL.

It is certified that error appears in the above-identified patent and that said Letters Patent is hereby corrected as shown below:

Column 5:
  Line 10, "results" should read --result--.
  Line 11, "these" should read --there--.

Column 6:
  Line 2, "aid" should read --said--.
  Line 19, "an" should read --a--.

Signed and Sealed this

Twenty-ninth Day of March, 1994

Attest:

BRUCE LEHMAN

Attesting Officer         Commissioner of Patents and Trademarks